Patented June 14, 1938

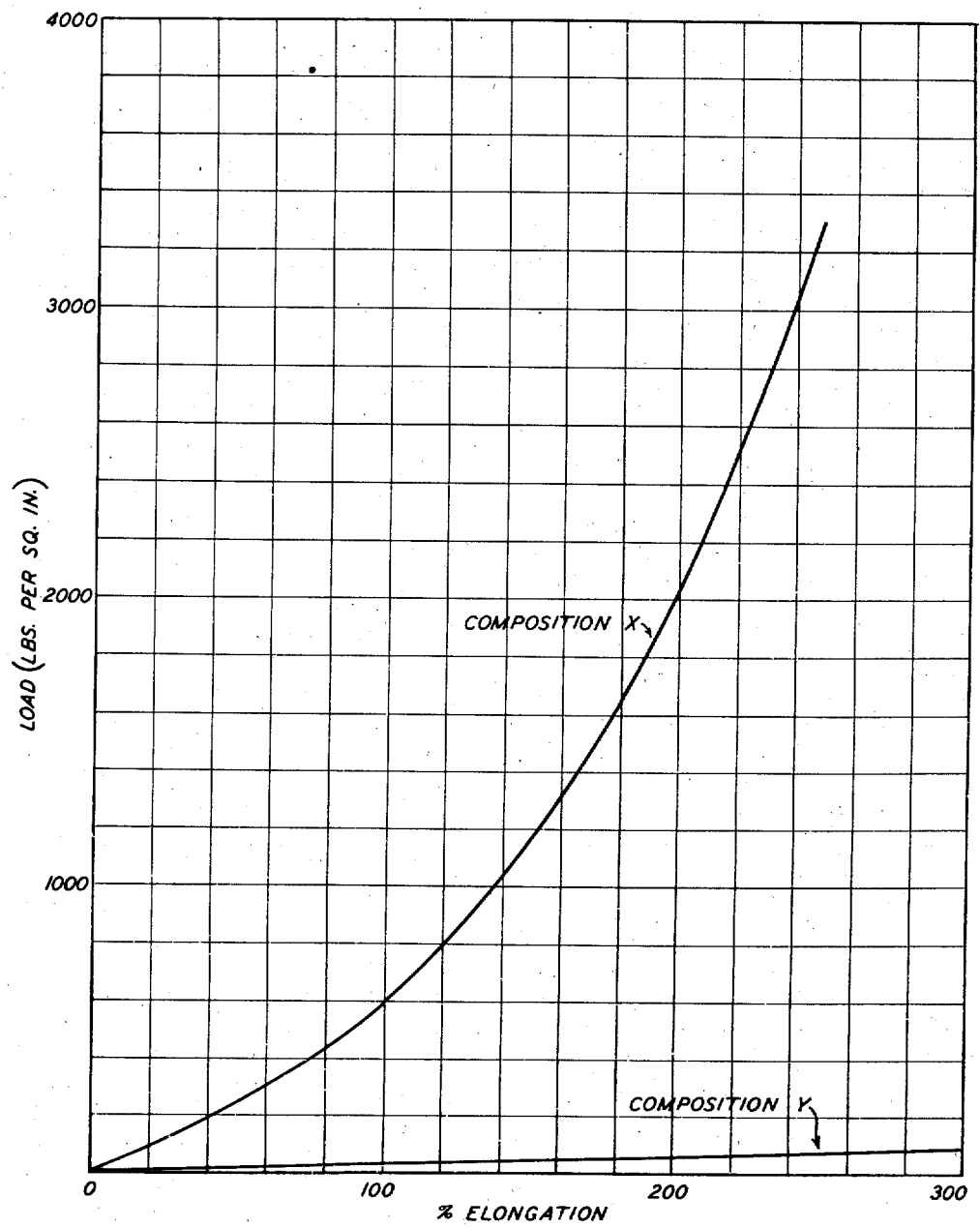

2,120,927

UNITED STATES PATENT OFFICE 2,120,927

PLASTIC COMPOSITION

Charles M. Blair, Charleston, and Thomas F. Carruthers, South Charleston, W. Va., assignors to Carbide and Carbon Chemicals Corporation, a corporation of New York Application July 1, 1936, Serial No. 88,294

18 Claims. (Cl. 106—22)

This invention is a plastic composition having unusual properties of elasticity and resiliency coupled with great strength and toughness. It is essentially composed of partial polyvinyl acetal resins colloided with hexoic acid esters of certain polyethylene glycols.

In appearance, the new composition is clear and colorless, and the combination of the resinous material with the plasticizer is so nearly permanent as to render these novel compositions extremely valuable where lasting qualities of strength and plasticity over a wide range of temperatures are desired. Typical of such applications of these plastic compositions is in the formation of laminated nonshattering glass, wherein a reinforcing plastic material of high strength, extreme clarity, good adhesion and permanent resiliency is of paramount importance.

Partial polyvinyl acetal resins may be prepared, for example, by the incomplete condensation of aldehydes with polyvinyl alcohol, and they contain in the polymeric aggregate both acetal groups and free alcoholic hydroxyl groups. The degree to which the hydroxyl groups of the polyvinyl macromolecule have been combined with aldehyde may be indicated directly, and will be referred to herein as percent (%) acetalization. Various methods have been proposed for making partial polyvinyl acetal resins, and the mode by which they originate is not essential to this invention.

Polyvinyl acetal resins which are completely acetalized, or nearly so, are wholly unsuited for making the plastic compositions of this invention, and not every partial polyvinyl acetal resin is entirely satisfactory. To obtain satisfactory partial polyvinyl acetal resins, it is necessary to use in their preparation a polyvinyl compound of high molecular weight, such as polyvinyl alcohol or an ester thereof having a molecular weight in excess of about 10,000, and resins prepared from polyvinyl acetate having an average molecular weight of at least 25,000 are preferred. (Molecular weights referred to herein are calculated by means of Staudinger's formula from viscosity determinations on solutions of the materials.) The suitability of a given resin of this type is determined by two additional factors, the more important of which is the degree of acetalization, and of nearly equal importance is the nature of the aldehyde from which it is made. In general, the resins useful for this invention are acetalized between about 35% and about 94%, and the aldehydes from which the most desirable resins are made are those of the aliphatic series containing from two to six carbon atoms, inclusive. Preferably, the aldehyde is both saturated and of straight chain structure, and of the aldehydes which are of this type, butyraldehyde, propionaldehyde and valeraldehyde are specifically preferred in the order given. The optimum degrees of acetalization which have been determined for resins to be used in this invention are from about 88% to 94% with acetaldehyde; from about 62% to 88% with propionaldehyde; from about 54% to 78% with butyraldehyde; and from about 39% to 58% with valeraldehyde.

The hexoic acid esters from which the new compositions are made may be those of diethylene glycol, triethylene glycol, tetraethylene glycol and pentaethylene glycol. Of this series, esters of the lower members are preferred, and, in particular, the dihexoates of triethylene glycol. The acid may be normal hexoic acid or one of its isomers, such as 2-ethyl butyric acid and 2-methyl pentoic acid.

The partial polyvinyl acetal resins described above are but slightly soluble in the esters mentioned, at ordinary temperatures. These resins do, however, have the property of dissolving the esters in quantities sufficient to yield adequately softened compositions. The new plastic compositions apparently tend to exist as solutions of the plasticizer in the resins, and thus have an opposite phase relationship to many of the usual and well known compositions of plasticizers with resins or cellulose esters, in which the resin or the like is quite compatible with the plasticizer.

The new compositions may be made by combining the polyglycol hexoate with the partial polyvinyl acetal resin in various ways. For example, the two materials may be dissolved in a mutual solvent, such as the lower alcohols, followed by elimination of the solvent. Alternatively, the resin and plasticizer may be mixed in the presence of a nonsolvent liquid, such as water or acetone, which wets or swells the resin to permit it to be penetrated by the plasticizer. Also, the plasticizer and resin may be mixed directly, in which case the resin, if in powdered form, will absorb the plasticizer without losing its finely divided form or becoming agglomerated. The resin and absorbed plasticizer may then be colloided to form a homogeneous plastic mass by a hot-pressing operation. Usual methods of resin compounding, such as those involving differential roll mills or kneading and mixing machines, may also be used to combine the resin and plasticizer with more or less efficacy.

The quantity of hexoate used in the compositions of this invention may vary widely depending on the degree of softness desired. For most purposes, up to about 60 parts by weight of the polyglycol hexoate to 40 parts by weight of the partial polyvinyl acetal resins are sufficient, and generally less than about 50 parts of plasticizer to 50 parts of resin are desirable. For use as a reinforcing sheet in nonshattering glass, compositions containing from about 25% to about 45% by weight of plasticizer are preferred, and within this range, those compositions containing around 30% by weight of plasticizer have proved to be very satisfactory.

The polyethylene glycol hexoates may be made by esterification processes which form no essential part of this invention. The method used for preparing triethylene glycol di(2-ethyl butyrate) given below is typical of such processes:

Triethylene glycol was reacted with 2-ethyl butyric acid in the presence of sulfuric acid as a catalyst. The quantities used were 1100 parts by weight of the triglycol, 1700 parts by weight of the acid, and 9 parts by weight of the catalyst. Benzene was employed to remove the water formed by distillation as the heterogeneous azeotrope of benzene and water, and the reaction was carried out at 175° C. After a reaction period of four hours, the product was neutralized with sodium carbonate, washed with water, and distilled at reduced pressure through a heated column. The pure ester was obtained as a water-white, substantially odorless, water-insoluble liquid having a specific gravity of 0.994 at 20°/20° C., and a boiling point of 181.5° C. at a pressure 3.5 mm. of mercury. The saponification equivalent of this ester was found to be 176.

In a similar manner were prepared diethylene glycol di(2-ethyl butyrate), boiling point 148° C. at 2 mm. of mercury, and specific gravity 0.979 at 20°/20° C.; tetraethylene glycol di(2-ethyl butyrate), specific gravity 1.012 at 20°/20° C.; pentaethylene glycol di(2-ethyl butyrate), specific gravity 1.022 at 20°/20° C.; and triethylene glycol di(2-methyl pentoate), boiling point 181.5° C. at 3.5 mm. of mercury, and specific gravity 0.994 at 20°/20° C.

Tests have shown that the plastic compositions of this invention have greater strength and toughness at high and low temperatures, as well as at ordinary temperatures, than both plastic compositions of similar types heretofore known, and compositions made by combining partial polyvinyl acetal resins with other known plasticizers. This superiority can be illustrated by comparing the resistance to failure by breaking or shattering of samples of laminated glass in which the different plastic compositions were used as the reinforcing layer.

In Table I are shown the vertical heights from which a one-half pound steel ball must be allowed to drop on to a sample of laminated glass 12 inches square to cause failure. In these tests, failure occurs when the falling ball penetrates the laminated sheets.

Table I

| Reinforcing sheet | Thickness of sheet (inches) | Height (feet) | | |
|---|---|---|---|---|
| | | 0° F. | 70° F. | 120° F. |
| A | 0.025 | 40 | 100 | 45 |
| B | 0.030 | —No failure at 130 | | |
| C | 0.020 | 2.5 | 20 | 22 |
| D | 0.025 | 2.0 | 40 | 12 |
| E | 0.025 | 3.0 | 30 | 32 |

The reinforcing sheets A and B were made according to this invention, and were identical except in thickness. Both sheets A and B were formed of a composition of a partial polyvinyl acetal resin 66% acetalized with butyraldehyde combined with triethylene glycol di(2-ethyl butyrate) to the extent of 31% by weight of the composition. Sheet C was a plasticized nitrocellulose composition. Sheet D was a plastic composition of polymerized acrylate resin, and sheet E was a plasticized cellulose acetate composition. Sheets C, D and E were formed of commercially available materials heretofore employed in nonshattering glass.

In Table II there is shown a comparison of plastic compositions embodying this invention with compositions made from the same partial polyvinyl acetal resins in combination with other common plasticizers. The tests reported are the same as those in Table I, but were conducted on samples 6 inches square.

Table II

| Reinforcing sheet | Thickness of sheet (inches) | Height (feet) | | |
|---|---|---|---|---|
| | | 0° F. | 80° F. | 120° F. |
| F | 0.030 | 24+ | 24 | 20 |
| G | 0.030 | 14 | 20 | 20 |
| H | 0.030 | 24 | | 24 |
| I | 0.030 | 16 | | 10 |
| J | 0.030 | | 33 | 30 |
| K | 0.030 | | 24 | 16 |

Reinforcing sheets F and G were made from a resin which was 66.5% acetalized with butyraldehyde. Sheet F contained 31% by weight of triethylene glycol di(2-ethyl butyrate) in the composition, while sheet G contained 37.5% by weight of diethyl phthalate in the composition. Sheets H and I were made from a resin which was 66.5% acetalized with butyraldehyde. Sheet H contained 30% by weight of triethylene glycol di(2-ethyl butyrate) in the composition, and sheet I contained 37.5% of diethyl phthalate. Sheets J and K were made from a resin which was 64.5% acetalized with butyraldehyde. Sheet J contained 31% by weight of triethylene glycol di(2-ethyl butyrate), and sheet K contained 40% by weight of dibutyl phthalate.

These proportions of plasticizers used in the materials tested as reported in Table II represent optimum quantities determined for each of the three esters, and in every case the quantity of plasticizer was adjusted to secure maximum, and nearly equal resistance to shattering at 0° and 120° F. The results shown in Table II also demonstrate the effect of varying degrees of acetalization upon the properties of the compositions.

In addition to the data just discussed, the compositions of this invention have further advantages over compositions made from the partial polyvinyl acetal resins and other known plasticizers. For example, laminated glass made with the reinforcing sheet F of table II was entirely free from bubbles, and remained clear after being heated at 260° F. for 320 hours, while laminated glass made with reinforcing sheet G bubbled badly after 45 minutes heating at the same temperature.

Possibly because of the lack of complete solubility of the resin in the plasticizer in the novel compositions of this invention, the softening point of these compositions is high, and the strength and resiliency of the compositions are great. These latter properties are important and are illustrated by the stress-strain characteristics of the new compositions. By comparison with the stress-strain characteristics of other plastic compositions in which the resin (or the like) is dissolved in the plasticizer, the unusual properties of the new compositions will be apparent. Such a comparison is shown by the curves in the accompanying drawing.

Referring to the drawing, two stress-strain curves are presented which were plotted from test results obtained under identical conditions on two plastic compositions X and Y. Composition X was made in accordance with this invention, and was composed of 69% by weight of a partial polyvinyl acetal resin which was 66% acetalized with butyraldehyde combined with 31% by weight of triethylene glycol di(2-ethyl butyrate). Composition Y was an exact duplicate of composition X except that the resin used was almost completely acetalized. This high degree of acetalization rendered the resin soluble in the plasticizer, and composition Y had an ultimate strength of less than 100 pounds per square inch.

While the new compositions are especially valuable in the manufacture of nonshattering glass, their usefulness is by no means confined to this purpose, they may be employed generally where tough and resilient plastic materials are required. Modifications of the invention are possible, and are included within its scope as defined by the appended claims.

We claim:

1. Plastic composition having great strength and toughness essentially composed of a water-insoluble partial polyvinyl acetal resin combined with a polyethylene glycol hexoate, said resin being characterized by its substantial insolubility in the polyethylene glycol hexoate at ordinary temperatures and by its capacity to absorb sufficient quantities of the polyethylene glycol hexoate to yield softened, resilient compositions.

2. Plastic composition having great strength and toughness essentially composed of a water-insoluble partial polyvinyl acetal resin combined with a triethylene glycol hexoate, said resin being characterized by its substantial insolubility in the triethylene glycol hexoate at ordinary temperatures and by its capacity to absorb sufficient quantities of the triethylene glycol hexoate to yield softened, resilient compositions.

3. Plastic composition having great strength and toughness essentially composed of a partial polyvinyl acetal resin combined with a polyethylene glycol hexoate of a polyethylene glycol having from four to ten carbon atoms, said resin being acetalized between about 35% and about 94% with an aliphatic aldehyde having from two to six carbon atoms, and said resin being characterized by its substantial insolubility in the polyethylene glycol hexoate at ordinary temperatures and by its capacity to absorb sufficient quantities of the polyethylene glycol hexoate to yield softened, resilient compositions.

4. Plastic composition having great strength and toughness essentially composed of a partial polyvinyl acetal resin combined with a triethylene glycol hexoate, said resin being acetalized between about 35% and about 94% with a saturated straight chain aliphatic aldehyde having from two to six carbon atoms, and said resin being characterized by its substantial insolubility in the triethylene glycol hexoate at ordinary temperatures and by its capacity to absorb sufficient quantities of the triethylene glycol hexoate to yield softened, resilient compositions.

5. Tough and resilient plastic composition essentially composed of a partial polyvinyl acetal resin combined with a polyethylene glycol hexoate of a polyethylene glycol having from four to ten carbon atoms, said resin being selected from the group consisting of those acetalized from about 88% to about 94% with acetaldehyde, from about 62% to 88% with propionaldehyde, from about 54% to about 78% with butyraldehyde, and from about 39% to about 58% with valeraldehyde.

6. Tough and resilient plastic composition essentially composed of a partial polyvinyl acetal resin combined with a triethylene glycol hexoate, said resin being selected from the group consisting of those acetalized from about 88% to about 94% with acetaldehyde, from about 62% to about 88% with propionaldehyde, from about 54% to about 78% with butyraldehye, and from about 39% to about 58% with valeraldehyde.

7. Tough and resilient plastic composition essentially composed of a partial polyvinyl acetal resin combined with a triethylene glycol hexoate chosen from the group consisting of 2-ethyl butyrates and 2-methyl pentoates, said resin being selected from the group consisting of those acetalized from about 88% to about 94% with acetaldehyde, from about 62% to about 88% with propionaldehyde, from about 54% to about 78% with butyraldehyde, and from about 39% to about 58% with valeraldehyde.

8. Tough and resilient plastic composition essentially composed of a partial polyvinyl acetal resin combined with a triethylene glycol ester of 2-ethyl butyric acid, said resin being selected from the group consisting of those acetalized from about 88% to about 94% with acetaldehyde, from about 62% to about 88% with propionaldehyde, from about 54% to about 78% with butyraldehyde, and from about 39% to about 58% with valeraldehyde.

9. Tough and resilient plastic composition essentially composed of a partial polyvinyl acetal resin combined with a triethylene glycol ester of 2-methyl pentoic acid, said resin being selected from the group consisting of those acetalized from about 88% to about 94% with acetaldehyde, from about 62% to about 88% with propionaldehyde, from about 54% to about 78% with butyraldehyde, and from about 39% to about 58% with valeraldehyde.

10. Tough and resilient plastic composition essentially composed of a partial polyvinyl acetal resin about 54% to about 78% acetalized with butyraldehyde, combined with a polyethylene glycol hexoate of a polyethylene glycol having from four to ten carbon atoms.

11. Tough and resilient plastic composition essentially composed of a partial polyvinyl acetal resin about 54% to about 78% acetalized with butyraldehyde, combined with a triethylene glycol hexoate.

12. Tough and resilient plastic composition essentially composed of a partial polyvinyl acetal resin about 54% to about 78% acetalized with butyraldehyde, combined with a triethylene glycol hexoate chosen from the group consisting of 2-ethyl butyrates and 2-methyl pentoates.

13. Tough and resilient plastic composition essentially composed of a partial polyvinyl acetal resin about 54% to about 78% acetalized with butyraldehyde, combined with a triethylene glycol ester of 2-ethyl butyric acid.

14. Tough and resilient plastic composition essentially composed of a partial polyvinyl acetal resin about 54% to about 78% acetalized with butyraldehyde, combined with a triethylene glycol ester of 2-methyl pentoic acid.

15. Tough and resilient plastic composition essentially composed of a partial polyvinyl acetal resin about 54% to about 78% acetalized with butyraldehyde, combined with triethylene glycol di(2-ethyl butyrate), said triethylene glycol di(2-ethyl butyrate) constituting from about 25% to about 45% of the total weight of the composition.

16. Tough and resilient plastic composition essentially composed of a partial polyvinyl acetal resin about 54% to about 78% acetalized with butyraldehyde, combined with triethylene glycol di(2-methyl pentoate), said triethylene glycol di(2-methyl pentoate) constituting from about 25% to about 45% of the total weight of the composition.

17. Method of making tough and resilient compositions having great extensibility which comprises colloiding a water-insoluble partial polyvinyl acetal resin with a polyethylene glycol hexoate, said resin being characterized by its substantial insolubility in the polyethylene glycol hexoate at ordinary temperatures and by its capacity to absorb sufficient quantities of the polyethylene glycol hexoate to yield softened compositions.

18. Method of making tough and resilient compositions having great extensibility which comprises colloiding a water-insoluble partial polyvinyl acetal resin with a polyethylene glycol hexoate by the aid of heat and pressure, said resin being characterized by its substantial insolubility in the polyethylene glycol hexoate at ordinary temperatures and by its capacity to absorb sufficient quantities of the polyethylene glycol hexoate to yield softened compositions.

CHARLES M. BLAIR.
THOMAS F. CARRUTHERS.

Certificate of Correction

Patent No. 2,120,927.     June 14, 1938.

CHARLES M. BLAIR ET AL.

It is hereby certified that error appears in the printed specification of the above numbered patent requiring correction as follows: Page 2, first column, lines 67–75, strike out the last three columns of the table and insert instead the following:

| Height (feet) | | |
| --- | --- | --- |
| 0° F. | 70° F. | 120° F. |
| 40 | 100 | 45 |
|  | No failure at 130 |  |
| 2.5 | 20 | 22 |
| 2.0 | 40 | 12 |
| 3.0 | 30 | 32 | and that the said Letters Patent should be read with this correction therein that the same may conform to the record of the case in the Patent Office.

Signed and sealed this 19th day July, A. D. 1938.

[SEAL]

HENRY VAN ARSDALE,
Acting Commissioner of Patents.

14. Tough and resilient plastic composition essentially composed of a partial polyvinyl acetal resin about 54% to about 78% acetalized with butyraldehyde, combined with a triethylene glycol ester of 2-methyl pentoic acid.

15. Tough and resilient plastic composition essentially composed of a partial polyvinyl acetal resin about 54% to about 78% acetalized with butyraldehyde, combined with triethylene glycol di(2-ethyl butyrate), said triethylene glycol di(2-ethyl butyrate) constituting from about 25% to about 45% of the total weight of the composition.

16. Tough and resilient plastic composition essentially composed of a partial polyvinyl acetal resin about 54% to about 78% acetalized with butyraldehyde, combined with triethylene glycol di(2-methyl pentoate), said triethylene glycol di(2-methyl pentoate) constituting from about 25% to about 45% of the total weight of the composition.

17. Method of making tough and resilient compositions having great extensibility which comprises colloiding a water-insoluble partial polyvinyl acetal resin with a polyethylene glycol hexoate, said resin being characterized by its substantial insolubility in the polyethylene glycol hexoate at ordinary temperatures and by its capacity to absorb sufficient quantities of the polyethylene glycol hexoate to yield softened compositions.

18. Method of making tough and resilient compositions having great extensibility which comprises colloiding a water-insoluble partial polyvinyl acetal resin with a polyethylene glycol hexoate by the aid of heat and pressure, said resin being characterized by its substantial insolubility in the polyethylene glycol hexoate at ordinary temperatures and by its capacity to absorb sufficient quantities of the polyethylene glycol hexoate to yield softened compositions.

CHARLES M. BLAIR.
THOMAS F. CARRUTHERS.

Certificate of Correction

Patent No. 2,120,927.   June 14, 1938.

CHARLES M. BLAIR ET AL.

It is hereby certified that error appears in the printed specification of the above numbered patent requiring correction as follows: Page 2, first column, lines 67–75, strike out the last three columns of the table and insert instead the following:

| Height (feet) | | |
| --- | --- | --- |
| 0° F. | 70° F. | 120° F. |
| 40 | 100 | 45 |
|  | No failure at 130 |  |
| 2.5 | 20 | 22 |
| 2.0 | 40 | 12 |
| 3.0 | 30 | 32 | and that the said Letters Patent should be read with this correction therein that the same may conform to the record of the case in the Patent Office.

Signed and sealed this 19th day July, A. D. 1938.

[SEAL]

HENRY VAN ARSDALE,
Acting Commissioner of Patents.

Certificate of Correction

Patent No. 2,120,927.
June 14, 1938.

CHARLES M. BLAIR ET AL.

It is hereby certified that error appears in the printed specification of the above numbered patent requiring correction as follows: Page 2, first column, lines 67–75, strike out the last three columns of the table and insert instead the following:

| Height (feet) | | |
| --- | --- | --- |
| 0° F. | 70° F. | 120° F. |
| 40 | 100 | 45 |
|  | No failure at 130 |  |
| 2.5 | 20 | 22 |
| 2.0 | 40 | 12 |
| 3.0 | 30 | 32 | and that the said Letters Patent should be read with this correction therein that the same may conform to the record of the case in the Patent Office.

Signed and sealed this 19th day July, A. D. 1938.

[SEAL]

HENRY VAN ARSDALE,
*Acting Commissioner of Patents.*